Figure 1:
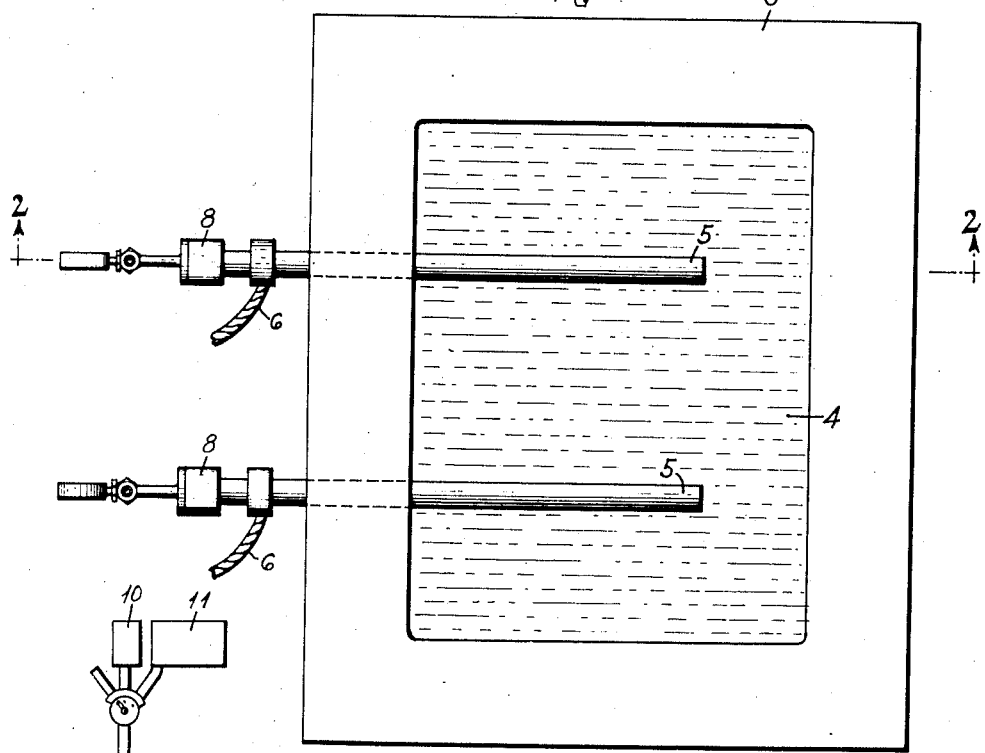

Nov. 18, 1941.    Y. PEYCHES    2,263,549

ELECTRICAL HEATING OF LIQUID BATHS

Filed Aug. 2, 1939

INVENTOR.
YVAN PEYCHES

BY
*Richards & Geier*
ATTORNEYS

UNITED STATES PATENT OFFICE 2,263,549

ELECTRICAL HEATING OF LIQUID BATHS

Yvan Peyches, Paris, France, assignor to Societe Anonyme des Manufactures des Glaces & Produits Chimiques de Saint-Gobain, Chauny & Cirey, Paris, France, a corporation of France Application August 2, 1939, Serial No. 287,913
In France August 5, 1938

18 Claims. (Cl. 219—40)

This invention relates to the heating of liquid baths, such as baths of molten glass or salts, by the Joule effect of an electrical current passing through the liquid substances from electrodes immersed in them. The invention refers more specifically to methods of heating, melting and fining various substances, such as methods for the fining of glass in tank furnaces, and to electrical furnaces for treating or heating a glass mass or other conducting substances.

In the art of heating wherein the passage of an electrical current supplied by an electrode and flowing through a liquid mass is utilized for heating that mass, the flow of the current is often accompanied by the formation of bubbles originating at the outer surfaces of the current-transmitting electrodes. The formation of these bubbles may be caused mainly by a transformation of the treated substances resulting from the heat treatment, by reactions between the treated substances caused by the heating, for instance, in the case of glass baths, the heating may cause reactions between the glassy substances, or, the bubbles may be formed as a result of a reaction between the treated substances and the electrode itself. These reactions at the outer surfaces of an electrode are generally more vigorous when the temperature at or near that surface is high.

For example, an active formation of bubbles takes place in tank furnaces for manufacturing glass, where a glass mass is brought into contact with electrodes which are so formed and placed that the density of the electrical current is quite great in a zone close to the electrode and is greater in that zone than elsewhere, so that the glass mass flowing in the tank furnace is heated to a very high temperature at the time when it passes close to the electrode.

In some processes the formation of these bubbles may cause certain detrimental results, and it may make it necessary to limit the high temperature of a heating zone in order to avoid an undue production of bubbles. This is disadvantageous, since in the manufacture of glass it is desirable to maintain the highest possible temperature at the heating zone around the electrode.

In other instances, however, it is advisable to further the formation of bubbles, since they increase convection currents which transmit heat to various parts of the heated mass.

Also, it is sometimes of advantage to influence, regulate or create reactions at the surface of an electrode by supplying certain gases to that surface.

An object of the present invention is to improve methods and means for heating liquid substances by the Joule effect of an electrical current, for the purpose of eliminating disadvantageous phenomena occurring at or close to the surface of the electrode or electrodes, or furthering various desirable chemical and physical processes taking place in or close to that zone.

Other objects of the present invention will become apparent in the course of the following specification.

The objects of the present invention may be realized by making hollow at least one of the electrodes immersed in the liquid bath, by forming this electrode of a material which is porous or permeable by gases, and by influencing through the provision of such an electrode the phenomena which take place in the vicinity of the electrode, and particularly at the outer surfaces thereof. The hollow interior of the electrode should be closed to substances constituting the bath to be heated, and may be connected to evacuating means, or to means supplying a gas to the interior thereof, or the interior may be opened to the atmosphere.

In all these instances, a difference in pressure is created between the interior of the electrode and the outer surfaces thereof. Due to the porosity of the electrode, this difference in pressure is available at the outer surfaces of the electrode which are in contact with the substances to be treated, thus influencing the phenomena taking place upon or at the surface of the electrode, and causing a radial flow of a gas through the walls of the electrode.

In certain processes, sub-atmospheric pressure or a vacuum is maintained in the interior of the electrode. In other processes, gases of predetermined pressure or nature are supplied to the interior of the electrode. These gases may consist of atmospheric air or of different gases having a higher pressure; the last-mentioned gases may be so selected that they participate in the reactions taking place at the outer surfaces of the electrode.

The invention will appear more clearly from the following detailed description when taken in connection with the accompanying drawing, showing by way of example a preferred embodiment of the inventive idea.

Figure 2:
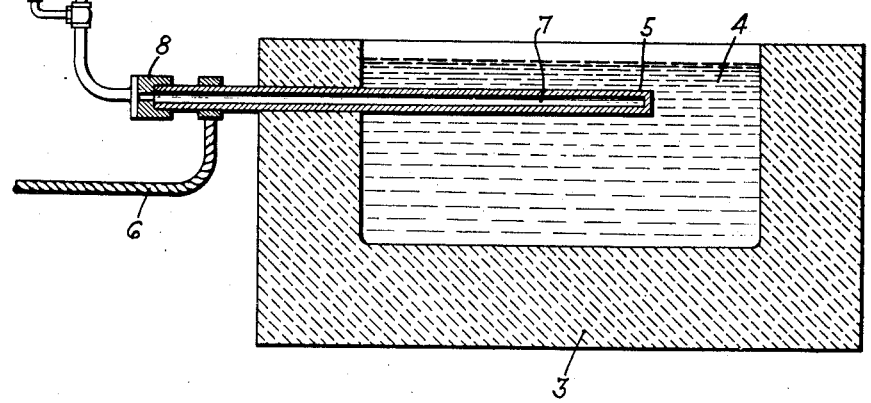

In the drawing:

Figure 1 is a top view of a device constructed in accordance with the principles of the present invention; and Figure 2 is a vertical section along the line 2—2 of Figure 1.

The drawing shows a container 3, which may constitute a part of a tank furnace and which may be filled with a liquid substance 4, such as a glass mass. Electrodes 5 pass from outside the container 3 into the liquid mass 4, the current being supplied to the electrodes 5 by conductors 6 and flowing from an electrode through the mass 4 to another electrode. The conduits or cables 6 are connected to a source of electrical energy not shown in the drawing.

Each of the electrodes 5 has an inner chamber or a hollow interior 7 and is made of a material which is porous or permeable by gases. It was found that as far as glass fusing processes are concerned, graphite has the requisite permeability to gases, and may be a good material for the electrode, since it is sufficiently porous to assure that pressure differences and other conditions or gases prevailing or present within the inner chamber 7 of the electrode 5 will be transmitted to the outer surfaces of that electrode and vice versa.

Each electrode carries a gas-tight head or connection 8 leading to a pipe 9.

As indicated diagrammatically in the drawing, the pipe 9 may be connected to evacuating means, such as a vacuum pump 10, or to a source 11 of gas of predetermined pressure and nature, or the pipe 9 may be left open to the atmosphere. In actual practice, however, only one of these means will be usually connected to the electrodes of a furnace.

As already stated, in the course of a great many heat treatments by the Joule effect of an electrical current, for instance, in tank furnaces for the manufacture or fining of glass, bubbles are produced at the outer surfaces of the electrodes as a result of the contact of the electrodes 5 with the masses 4 to be treated. In these furnaces, the raw materials are introduced at one end of the tank and finished glass is removed from the other end of the tank, the glass mass flowing within the tank from the input end toward the delivery end and being heated in the course of that flow by electrodes producing hot zones situated within the flow.

In many instances, it is most desirable to diminish the production of bubbles around the electrodes, for example, in order to be able to increase the temperature of the heating zone around an electrode, or to maintain this heating zone at a selected high temperature. Bubbles constitute an obstacle or an ohmic resistance to the passage of an electrical current in the glass mass and if the formation of bubbles is diminished or eliminated, currents of greater intensity may be transmitted through the glass mass.

It was found that the development of bubbles is diminished if the interior 7 of the electrode 5 is connected with the atmosphere through the head 8 and the pipe 9.

If a stronger effect is desired, the interior 7 of the electrode 5 may be connected through the head 8 and the pipe 9 with the evacuating means 10.

The choice between atmospheric or sub-atmospheric pressure and the selection of the degree of vacuum applied depends to a large extent on the position of the electrode in the bath and the viscosity and density of the bath. A bubble tending to form at the outer surface of the electrode 5 will dissipate itself through the wall of the electrode 5 into the hollow 7, if it can pass more easily through the pores of the electrode 5 into the hollow 7 on account of the degree of pressure or vacuum prevailing in the hollow 7, than disengage itself from the surface of the electrode 5 into the bath 4. The lower the pressure in the hollow 7, i. e., the greater the degree of vacuum therein, the easier will be the passage of the bubble through the walls of the electrode 5 into the interior thereof. Furthermore, the disengagement of the bubble from the outer surfaces of the electrode 5 and its flow into the bath 4 are made more difficult when the viscosity of the liquid is great and when the pressure at the zone of formation of the bubble is also great.

For these reasons, it is usually advisable to connect the hollow 7 of the electrode 5 to an evacuating means 10 when an electrode of a glass furnace is situated near the upper level of the glass mass, where the pressure of the liquid is low and the glass mass is very hot, the viscosity of the mass being also low by reason of the high temperature, since all these factors tend to cause a rapid flow of bubbles through the glass mass.

Furthermore, evacuating means 10 may be applied advantageously when electrodes are used which are made of graphite and which are heated to a very high extent, since then it is most desirable to prevent the access of atmospheric air into the interior 7 of the electrode 5, which may cause the burning away of the graphite forming the inner walls of the electrode.

However, in certain heat treatments, the formation of bubbles in the hot zone around the electrode 5 does not affect the treatment detrimentally and on the contrary, it may be of advantage to produce a larger number of bubbles in that zone. This may be the case whenever a greater circulation within a liquid bath is desired. When in tank furnaces the electrodes are located at a substantial depth below the surface of the glass mass, it may be desirable to further the development of bubbles around the electrodes in order to increase and accelerate the usual upwardly directed convection currents, or to produce such currents, which will bring highly heated glass from the neighborhood of the electrodes to heat to a high temperature partially melted or unfined glass at the surface of the bath, where by reason of its lower specific gravity it tends to collect. Since glass permeated with bubbles is lighter, the production of bubbles at the electrode surfaces increases the speed of the upward convection currents from the hot zones around the electrodes, thus increasing the quantity of the glass mass which passes through those hot zones.

The gas is caused to flow from the container 11 through the pipe 9 and the head 8 into the interior 7 of the electrode 5, and due to its pressure and the porosity of the electrode 5, the gas flows radially through the walls of the electrode and reaches its outer surfaces. Then the reactions taking place at the outer surfaces of the electrode are conditioned or regulated, depending upon the nature and the pressure of the gas, which will also further the formation of bubbles to a considerable extent, which, as already stated, rise to the surface of the bath and accelerate vertical convection currents, thus increasing the quantity of the glass mass which passes through the highly heated zone around the electrode, and heating the upper layers of the glass mass.

The fining of glass by the removal of small bubbles distributed throughout the glass mass is facilitated by the large bubbles flowing through the glass mass and formed at the surface of the electrodes by the introduction of a gas into the interior 7 of the electrodes 5. Obviously, bubbles of a larger size are freed more readily than smaller bubbles and in the course of their passage they absorb the smaller bubbles and thus accelerate the final elimination of these bubbles.

It is obvious that when electrodes composed of graphite or other oxidizable substances are used for this process, then the gas introduced into the interior 7 of the electrode 5 should not contain free oxygen, if reactions between the electrode and the gas situated within the electrode are to be avoided, and that in that case the gas introduced into the electrode should be inert in relation thereto.

However, in certain instances it may be advantageous to utilize gases which have a certain effect upon the electrodes, upon the action or operation of the electrodes in relation to the substances to be treated by the current supplied by the electrodes, and/or upon the transformation or chemical reactions of these substances.

In general, in all heating processes wherein zones of high temperature are produced around electrodes by the concentration of lines of electrical current in these zones, the method and the apparatus of the present invention are of particular advantage, since they make it possible to intervene directly in that part of the bath which is in contact with the electrodes, and, therefore, to influence those parts of the bath which have the highest temperature, so that this influence is particularly efficacious. For instance, gas formed as a result of reactions in the hot zone may be eliminated or gas needed to assist these reactions may be supplied at the points where the reaction mainly takes place.

It is apparent that the specific illustrations shown and described above have been given by way of illustration and not by way of limitation, and that the structures and methods above described are subject to wide variation and modification without departing from the scope or intent of the invention, all of which variations and modifications are to be included within the scope of the present invention.

What I claim is:

1. In a method for heating liquid substances by the Joule effect of an electrical current flowing through these substances and supplied by electrodes situated within these substances, the step of providing, for at least one of the electrodes, a difference in pressure between the surface of said electrode which is in contact with these substances and another part of said electrode, in order to produce the passage of gases through the natural pores in the material constituting said electrode.

2. In a method for heating liquid substances by the Joule effect of an electrical current flowing through these substances and supplied by electrodes situated within these substances, the step of evacuating gases from these substances by using the porosity of at least one of the electrodes.

3. In a method for heating liquid substances by the Joule effect of an electrical current flowing through these substances and supplied by electrodes situated within these substancs, the step of supplying gases into these substances by using the natural porosity of at least one of the electrodes.

4. An electrical furnace for heating conducting liquid substances, comprising at least one electrode immersed in said substances, said electrode consisting at least partly of a material permeable by gases and having an hollow closed to said substances, and means for applying a sub-atmospheric pressure to the hollow of said electrode.

5. An electrical furnace for heating conducting liquid substances, comprising at least one electrode immersed in said substances, said electrode consisting at least partly of a material permeable by gases and having an hollow closed to said substances, means supplying a gas at a pressure higher than atmospheric pressure to the hollow of said electrode, and means connecting said electrode to a source of electrical energy for supplying electrical current to said substances to heat the same.

6. In an electrical furnace for heating conducting liquid substances, at least one electrode immersed in said substances, said electrode being hollow and consisting at least partly of a material permeable by gases, the hollow of the electrode being closed to said substances and open to atmosphere.

7. A method for treating an electrically conducting substance comprising the steps of passing electrical current through said substance between electrodes positioned below the surface of said substance for heating the latter, and withdrawing gases from said substance through interstices in the wall of at least one of said electrodes.

8. A method for treating electrically conducting substances comprising the steps of passing electrical current through said substance between electrodes positioned beneath the surface of said substance for heating the latter, and injecting gas into said substance through interstices in the wall of at least one of said electrodes.

9. In a method for treating an electrically conducting substance, heating said substance by means of electrodes immersed therein, and discharging gases from said substance through interstices in the walls of at least one of said electrodes.

10. In the art of making glass, the method which includes heating a mass of glass making materials to render the same viscous, and introducing a gaseous substance into said mass below the surface thereof through the natural interstices in the walls of an element extending into said mass to create bubbles which will rise to the surface and accumulate smaller gas bubbles naturally formed in the mass.

11. In the art of making glass, the method which includes heating a mass of glass making materials to render the same viscous, and introducing a gaseous substance into said mass below the surface thereof through the natural pores of an element extending into said mass to create rising currents in said mass.

12. Apparatus of the class described comprising a container, and means for treating an electrically conducting liquid substance in said container including a plurality of electrodes immersed in said substance, a source of electrical energy and means for electrically connecting said source and electrodes whereby electrical current passes from one of said electrodes to another through said substance to heat the same, at least one of said electrodes being hollow and comprising material permeable by gases and impermeable by said substance, the interior of said hollow electrode having communication with the outside of said container and being closed to said substance.

13. Apparatus of the class described, comprising a container and means for treating an electrically conducting liquid substance in said container including a plurality of electrodes, a source of electrical energy and means for electrically connecting said source and electrodes whereby electrical current passes from one of said electrodes to another through said substance to heat the same, at least one of said electrodes being relatively thin and comprising material permeable by gases and impermeable by said substance, said last-named electrode having one surface thereof in engagement with said substance and the opposed surface thereof in communication with the outside of the container whereby gases may pass through said permeable material to or from said substance.

14. Apparatus of the class described comprising a container, and means for treating an electrically conducting liquid substance in said container including a plurality of electrodes, a source of electrical energy and means for electrically connecting said source and said electrodes whereby electrical current passes from one of said electrodes to another through said substance to heat the same, at least one of said electrodes being hollow and comprising material permeable by a gas and impermeable by said liquid, the interior of said last-named electrode being closed to said liquid, and means connecting with the interior of said last-named electrode for controlling the gaseous pressure therein to effect the flow of gases through interstices in the wall of said last-named electrode.

15. In apparatus wherein liquids are heated by the Joule effect of an electrical current flowing between electrodes therein, the combination of a plurality of electrodes of different polarities, at least one of said electrodes being hollow and comprising a wall permeable by gas and impermeable by said liquid, the interior of said last-named electrode being closed to said liquid, and evacuating means connected with the interior of said last-named electrode.

16. In apparatus wherein glass is heated by the Joule effect of an electrical current flowing between electrodes immersed therein, the combination of a plurality of electrodes of different polarities, at least one of said electrodes consisting at least partly of relatively porous material and being hollow with the interior thereof closed to said glass, and means connected with the interior of said last-named electrode to provide a gaseous pressure in the interior of said last-named electrode which is less than the pressure at the surface of said last-named electrode which is in contact with said glass.

17. Apparatus of the class described comprising a container, means for heating liquids in said container and means for removing gases from said liquid including an element comprising materials permeable by gases and impermeable by said liquid, one surface of said element being contacted by said liquid, and means for creating sub-atmospheric pressure at the other surface of said element.

18. Apparatus of the class described comprising a container for a liquid substance, and means for removing gases from said liquid including a hollow element in said container comprising a wall permeable by gases in said substance and impermeable by said substance, the interior of said element being closed to said liquid and the outer surface of said element being contacted by said liquid, and means for creating a sub-atmospheric pressure in the interior of said element to withdraw said gases from said liquid substance.

YVAN PEYCHES.